Nov. 17, 1931.  E. C. McKENNY  1,831,818
TOOL RETAINER DEVICE
Filed June 27, 1928
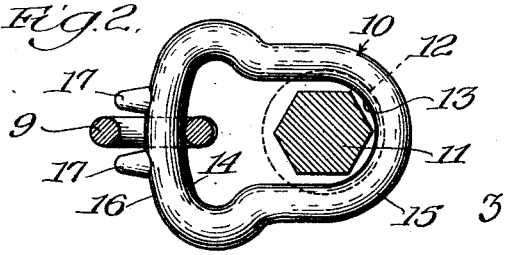
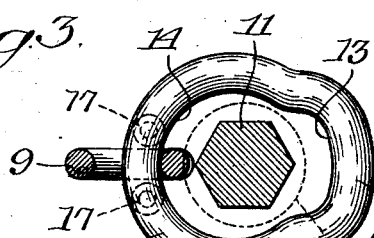
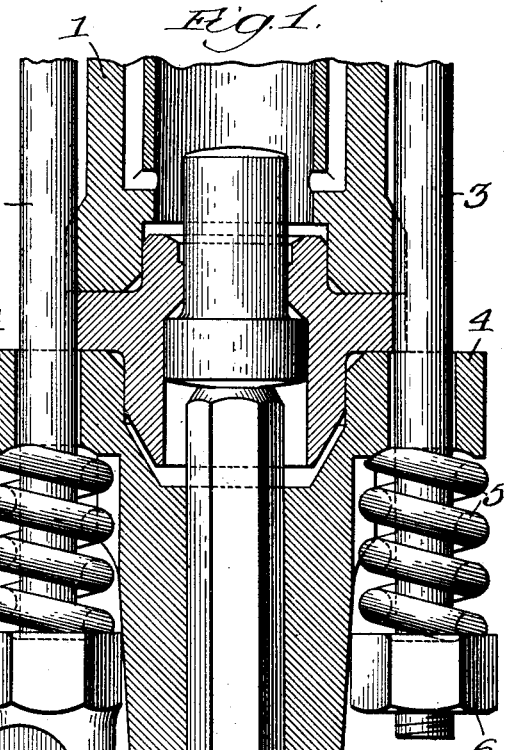
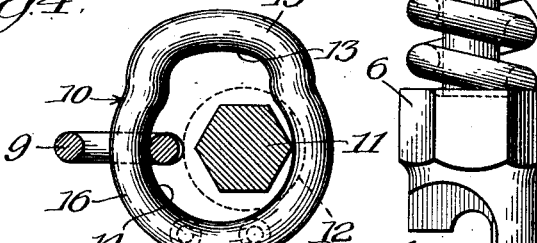
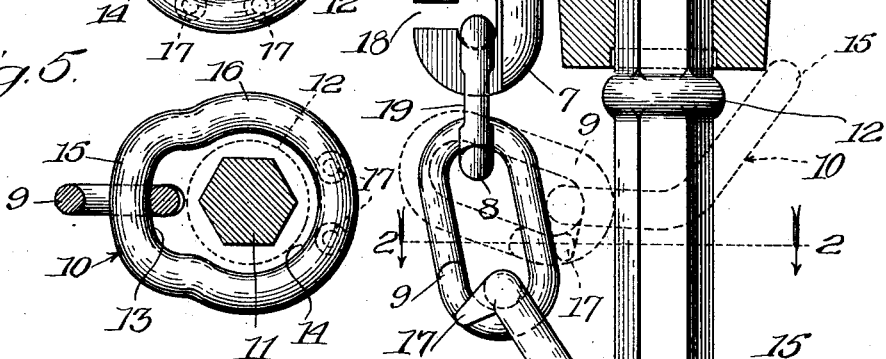
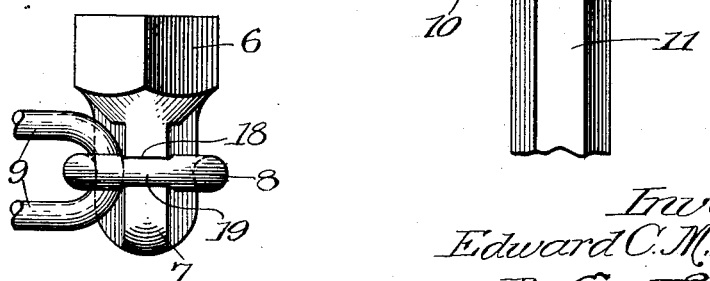
Inventor,
Edward C. McKenny Patented Nov. 17, 1931

1,831,818

UNITED STATES PATENT OFFICE

EDWARD C. McKENNY, OF CHICAGO, ILLINOIS, ASSIGNOR TO INDEPENDENT PNEUMATIC TOOL COMPANY, OF CHICAGO, ILLINOIS, A CORPORATION OF DELAWARE

TOOL RETAINER DEVICE

Application filed June 27, 1928. Serial No. 288,735.

This invention relates to improvements in drill steel retainers for percussive tools and more particularly for tools of the large type, such as employed for breaking paving and concrete.

The retainer of my invention has a member with an opening through which a drill steel extends and which opening has communicating portions of different sizes, the smaller to prohibit the passage of the collar on the steel to retain the latter in the tool or steel holding means, and the larger portion of the opening permitting the passage of the collar to remove and apply the steel.

One object of my invention is to have the means which connects the retainer member with the tool or steel holding means pass through the opening in the member so as to so restrict the larger portion of the opening that the collar on the steel can not pass through the same as long as the connecting means is in the larger portion of the opening, thereby preventing the release of the steel in the sliding of the retainer member up or down the same as the position of the tool is changed to meet the lay of the work and in handling and storage.

A further object of my invention is to require the retainer member to be lifted toward the collar on the steel and be rotated with respect thereto to free the larger portion of the connecting means so as to condition the opening for the passage of the collar therethrough.

A further object of the invention is to give the retainer member a bent shape so that said member may not accidentally rotate when in operative position to release the steel.

A further object of my invention is to flexibly connect the retainer member with a nut of one of the clamping bolts of the tool, so as to avoid the necessity and expense of providing additional means on the tool for the connection.

A further object of my invention is to provide a hook on the nut so that the connecting means will have a releasable connection therewith and thus permit the complete removal of the retainer for replacement and repair of its parts.

A further object of my invention is to make the opening in the hook so that the link which engages in the same may be removed from and inserted therein when disposed in a certain position, thereby preventing accidental release of the link while the retainer is attached to the tool.

The invention consists further in the matters hereinafter described and claimed.

In the accompanying drawings—

Fig. 1 is a vertical sectional view through the lower end of a paving breaker and showing applied thereto a retainer of my invention;

Fig. 2 is a plan section taken on line 2—2 of Fig. 1;

Figs. 3, 4, and 5 are similar sections to show the manner in which the retainer ring or member is rotated to release the steel; and Fig. 6 is a view showing the manner in which one of the links of the connecting chain is removed from and applied to the supporting hook.

In the drawings, 1 indicates the barrel of a paving breaker tool having a nozzle 2 at one end and a handle (not shown) at the other end. These parts are held in alignment by a number of long bolts 3, 3 which extend along the outside of the barrel and pass through lugs on the nozzle, barrel, and handle, respectively, as in tools of this general character. The lugs on the nozzle are marked 4, 4 and the bolts 3, 3 extend beyond said lugs to support coiled tension springs 5, 5 which are tightened against the lugs by nuts 6, 6 screwed on the outer ends of the bolts. By this arrangement the nozzle, barrel, and handle are tightly yet yieldably clamped together and the tension of the springs 5, 5 may be regulated by adjusting the nuts 6, 6 on the bolts.

One of the nuts 6 is provided with a hook member 7, preferably made integral therewith and to which the retainer chain is connected. Said chain comprises a pair of interconnected links 8, 9, with the link 8 connected with the hook member 7 and the link 9 connected with the retainer ring 10. The drill steel 11 extends out from the nozzle 2 and passes through the opening in the ring 10. The steel 11 has an enlargement or collar 12 between the nozzle 2 and the ring 10.

The opening in the ring 10 has communicating portions 13, 14 of different sizes, as shown in Figs. 2 to 5. The portion 13 is large enough to permit the steel 11 to pass freely therethrough but is smaller than the collar or enlargement 12 so that when the ring 10 is in its operative position, as shown in full lines in Fig. 1, the steel 11 can not drop or be shot out of the tool because the collar can not at this time pass through the ring, as indicated in Fig. 2. The other portion 14 of the opening is made larger than the collar 12 so that the collar may pass through the ring 10 when it is desired to remove the steel 11 from the tool or apply a steel thereto, as indicated in Fig. 5.

The ring 10 is bent to have angularly disposed portions 15, 16 which, respectively, contain the smaller and larger portions 13, 14 of the opening. With the ring 10 bent in this way, it will normally be suspended by its own weight from the chain 8—9 with the portion 15 extending across the steel 11 at substantially right-angles to the longitudinal axis thereof so as to dispose the smaller portion 13 of the opening about the steel 11 and in the best position to prohibit the collar 12 on the steel from passing through the ring. The bent shape of the ring 10 will also prevent it from accidentally rotating with respect to the steel 11 when the ring is in its referred to operative position. To guard against any possibility of accidental rotation of the ring 10 when in this position during the operation of the tool, I may provide lugs or projections 17, 17 on the ring 10 on opposite sides of the connecting link 9 where it engages the ring 10 at the larger portion 14 of the opening therein, as shown in Fig. 2.

With the link 9 engaging the ring 10 by extending through the opening therein, the thickness of the link will so restrict the larger portion 14 of the opening and will form an obstruction to the passage of the collar 12 on the steel 11 through the larger portion of the opening while the link 9 is in the same, as indicated in Fig. 3. Manifestly, even if the ring 10 is lifted or swung accidentally or otherwise towards the collar 12 to dispose the steel 11 in alinement with the larger portion 14 of the opening, the collar on the steel can not pass through the opening and the steel is prevented from dropping or being shot out of the tool.

In order to remove the steel 11 from the ring 10, it is necessary to so shift the parts that the ring 9 is removed from the larger to the smaller portion 13 of the opening in the ring. To accomplish this, the ring 10 is first lifted or raised close to the nozzle 2 of the tool, as shown in dotted lines in Fig. 1 and in full lines in Fig. 3, whereupon the ring may be rotated in a plane at right-angles to the longitudinal axis of the steel 11 to shift the link 9 into the smaller portion 13 of the opening in the ring and the steel in the larger portion 14 with the collar 12 on the steel in register with the larger portion 14 so that the collar may pass through the same, as indicated in Fig. 5. Until the link 9 is out of the larger portion 14 of the opening, the collar 12 can not pass through the same, as shown in Figs. 3 and 4.

In replacing the steel 11, the reverse operation takes place; the collar 12 is slipped through the larger portion 14 of the opening in the ring 10, while the link 9 is in the smaller portion 13 of said opening (Fig. 5). Then the ring 10 is rotated to dispose the link 9 in the larger portion 14 of the opening and the ring is allowed to drop, whereupon the steel 11 is disposed in the smaller portion 13 of the opening and the ring comes to rest against the steel 11 in its operative retaining position, as shown in full lines in Fig. 1.

The hook 7 has an opening or slot 18 in its front side for the link 8 to pass through on applying the link to and removing it from the hook. The link 8 is provided in one of its sides with a reduced portion 19 of a size to pass through the passage afforded by the slot 18, so that the link can pass through said slot only when the link is positioned with the reduced portion in the plane of the slot, as shown in Fig. 6. When engaged with the hook 7, the link 8 normally hangs downward therefrom with its reduced portion 19 at right-angles to the slot 18 and below the same. Thus the link can not become disengaged from the hook even when lifting and rotating the ring 10 to free the steel 11, because the portion of the link 8 at the slot is too large to pass therethrough. To remove the link 8 from the hook, it is necessary to shift the link until its reduced portion is in the plane of the slot 18, whereupon the reduced portion 19 may be passed through the slot. The reduced portion 19 may be made by milling down the sides of the link.

The link 9 is a split link, and therefore any single part of the retainer can be easily replaced in case of breakage or when worn out. The parts can not turn to come apart in operation, and it requires no tools to take the steel 11 out through the retainer or to take the retainer off the hook 7. To take the three links apart, the split link 9 is held open with a wedge or similar tool.

The retainer structure shown and described is simple in construction, efficient in use, and easily manufactured. The retainer will prevent the steel 11 from dropping or being shot out of the nozzle 2 in all positions of the tool, whether held up or down or at any angle, because the collar 12 on the steel can not pass through the ring 10 as long as the latter extends across the steel in advance of said collar. Thus the ring 10 may be lifted close to the collar and the later can not pass through the ring except on purposely rotating the ring to release the collar. The bent shape of the ring 10 prevents it from accidentally turning with respect to the steel, and as a result the ring will not release the collar 12 even if the ring happens to slide up the steel to dispose it in the larger portion 14 of the opening in the ring. There is no opportunity afforded for the ring 10 to accidentally release the steel during operation, handling, or storing of the tool, as the ring must be raised and purposely rotated to allow the collar 12 to pass through, and this can not accidentally happen, as the ring is held from accidental turning while engaged with the steel.

The details of structure shown and described may be variously changed and modified without departing from the spirit and scope of my invention.

I claim as my invention:

A drill steel retainer, comprising a member with an opening therein having communicating portions of different sizes, the larger to permit the passage therethrough of the collar on the steel and the smaller prohibiting the passage of said collar, the member in operative position being arranged with the steel extending through the smaller portion of the opening, and means flexibly connecting said member with the steel holding means, said connecting means extending through the opening in the member and requiring the latter to be rotated with respect to the steel to carry the connecting means out of the larger portion of the opening so that the collar may pass therethrough, said member being bent to have angularly disposed portions to prevent accidental rotation of the retainer member on the steel.

In testimony whereof I affix my signature.

EDWARD C. McKENNY.